US012610397B2

(12) United States Patent
Kiilerich Pratas et al.

(10) Patent No.: US 12,610,397 B2
(45) Date of Patent: Apr. 21, 2026

(54) ENHANCED CARRIER SELECTION

(71) Applicant: Nokia Technologies Oy, Espoo (FI)

(72) Inventors: Nuno Manuel Kiilerich Pratas,
Gistrup (DK); Lianghai Ji, Aalborg
(DK); Jakob Lindbjerg Buthler,
Aalborg (DK); Ling Yu, Kauniainen
(FI); Carlos Santiago Morejon Garcia,
Aalborg (DK); **Rasmus Liborius
Bruun**, Nørresundby (DK)

(73) Assignee: Nokia Technologies Oy, Espoo (FI)

( * ) Notice: Subject to any disclaimer, the term of this
patent is extended or adjusted under 35
U.S.C. 154(b) by 526 days.

(21) Appl. No.: 18/011,352

(22) PCT Filed: Jun. 10, 2021

(86) PCT No.: PCT/EP2021/065587
§ 371 (c)(1),
(2) Date: Dec. 19, 2022

(87) PCT Pub. No.: WO2022/002556
PCT Pub. Date: Jan. 6, 2022

(65) Prior Publication Data
US 2023/0232455 A1      Jul. 20, 2023

(30) Foreign Application Priority Data
Jun. 29, 2020      (FI) ..................................... 20205694

(51) Int. Cl.
*H04W 74/0816*        (2024.01)
(52) U.S. Cl.
CPC ............................... *H04W 74/0816* (2013.01)

(58) Field of Classification Search
CPC ................................................. H04W 74/0816
See application file for complete search history.

(56) References Cited

U.S. PATENT DOCUMENTS

| | | | |
|---|---|---|---|
| 6,560,445 B1 * | 5/2003 | Fette | ...................... H04L 27/30 |
| | | | 455/102 |
| 2015/0334643 A1 | 11/2015 | Maaref et al. | |
| 2016/0278088 A1 | 9/2016 | Cheng et al. | |
| 2017/0231011 A1 | 8/2017 | Park et al. | |

(Continued)

FOREIGN PATENT DOCUMENTS

| | | |
|---|---|---|
| CN | 110959301 A | 4/2020 |
| CN | 110999444 A | 4/2020 |

(Continued)

OTHER PUBLICATIONS

Office Action received for corresponding Finnish Patent Application
No. 20205694, dated Mar. 15, 2023, 7 pages.

(Continued)

*Primary Examiner* — James P Duffy

(74) *Attorney, Agent, or Firm* — Barta Jones, PLLC

(57) ABSTRACT

Apparatus and method in a communication system for
enhanced carrier selection are provided. The solution com-
prises selecting a carrier for first transmission to a second
apparatus; controlling transmission utilising the selected
carrier; receiving a transmission from the second apparatus
and selecting a carrier for second transmission to the second
apparatus at least partly based on the transmission from the
second apparatus.

7 Claims, 6 Drawing Sheets

(56) References Cited

U.S. PATENT DOCUMENTS

2018/0176953 A1   6/2018   Hampel
2019/0350045 A1   11/2019   Lee et al.
2019/0387377 A1*   12/2019   Zhang ................. H04W 52/383

FOREIGN PATENT DOCUMENTS

EP        3 518 589 A1    7/2019
EP        3 567 963 A1    11/2019
WO    WO 2020/085854 A1    4/2020

OTHER PUBLICATIONS

Office Action received for corresponding Finnish Patent Application No. 20215076, dated Mar. 17, 2023, 4 pages.
Office action received for corresponding Indian Patent Application No. 202317002637, dated Jan. 1, 2024, 7 pages.
International Search Report and Written Opinion mailed in corresponding PCT/EP2021/065587 on Oct. 20, 2021, 17 pages.
ITL, "Remaining issue on Tx carrier (re)selection," 3GPP TSG-RAN WG2 Meeting #105, R2-1902191, Mar. 2019, 2 pages.
Spreadtrum Communications, "Negotiation of TX resource pool(s) for SL unicast," 3GPP TSG-RAN WG2 Meeting #106, R2-1905677, May 2019, 2 pages.
Qualcomm Incorporated, "Sidelink Resource Allocation Mechanism for NR V2X," 3GPP TSG RAN WG1 Ad-Hoc Meeting 1901, R1-1900887, Jan. 21-25, 2019, 10 pages.
Nokia Shanghai Bell, "Discussion on SL radio link management," 3GPP TSG-RAN WG2 Meeting #107bis, R2-1913127, Oct. 14-18, 2019, 4 pages.
Office Action mailed in corresponding FI Patent Application No. 20205694 on Oct. 19, 2020, 8 pages.

Ericsson, "On Mode 2 Resource Allocation for NR Sidelink", 3GPP TSG-RAN WG-1 Meeting #94-BIS, Tdoc R1-1811594, Oct. 8-12, 2018, 10 pages.
Office Action mailed in corresponding FI Patent Application No. 20205694 on Mar. 7, 2022, 8 pages.
3GPP, "Study on enhancement of 3GPP Support for 5G V2X Services", TR-22.886, V16.2.0, Release 16, Dec. 2018, 76 pages.
3GPP, "Technical Specification Group Radio Access Network; Evolved—Universal Terrestrial Radio Access (E-UTRA); Medium Access Control (MAC) protocol specification," TS 36.321, v15.8.0, Release 15, Dec. 2019, 134 pages.
3GPP, "Technical Specification Group Radio Access Network; NR; Medium Access Control (MAC) Protocol Specification," TS 38.321, v15.8.0, Release 15, Dec. 2019, 78 pages.
3GPP, "Technical Specification Group Core Network and Terminals; User Equipment (UE) to V2X Control Function; protocol aspects; Stage 3," TS 24.386, V15.2.0, Release 15, Dec. 2018, 35 pages.
3GPP, "Technical Specification Group Radio Access Network; Evolved—Universal Terrestrial Radio Access (E-UTRA); Radio Resource Control (RRC); Protocol specification," TS 36.331, V12.18.0, Release 12, Mar. 2019, 464 pages.
LG Electronics, "New WID on NR sidelink enhancement," 3GPP TSG RAN Meeting #86, RP-193231 (revision of RP-193134), Dec. 9-12, 2019, 6 pages.
3GPP, "Technical Specification Group Radio Access Network; Evolved—Universal Terrestrial Radio Access (E-UTRA); Physical layer; measurement," TS 36.214, v16.0.0, Release 16, Dec. 2019, 26 pages.
Office action received for corresponding Chinese Patent Application No. 202180045952.3, dated Apr. 18, 2025, 10 pages of office action and no page of translation available.

* cited by examiner

ENHANCED CARRIER SELECTION

CROSS-REFERENCE TO RELATED APPLICATIONS

This application is based on and claims the benefit of International Patent Application No. PCT/EP2021/065587, filed on Jun. 10, 2021, which claims the benefit of Finnish Patent Application No. 20205694, filed on Jun. 29, 2020, each of which is hereby incorporated herein by reference in its entirety.

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. Wireless communication amongst vehicles has been under study during recent years. It has been estimated that development of Intelligent transportation systems, ITS, will improve road safety and traffic efficiency. Communication between vehicles and between infrastructure is a vital part of ITS. Vehicle-to-vehicle communication, V2V, and vehicle-to-infrastructure communication, V2I, will enable communication related to various use cases, such as broadcasting situation awareness messages for assisted driving, sending emergency alerts (braking and vulnerable road user detection, for example) to increase safety, executing cooperative manoeuvres such as lane merging or platooning and more.

Vehicular connectivity over cellular technology, such as cellular system developed by Third Generation Partnership Project, 3GPP, is denoted as Cellular Vehicle to Everything, C-V2X. It is being standardized along with the development of 5G (or New Radio, NR) communication system. Direct Vehicle to Vehicle communication without a link via a Radio Access Network, RAN, node, is denoted as sidelink.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus including a processor and a memory including instructions where the instructions, when executed by the processor, cause the apparatus to select a carrier for first transmission to a second apparatus, control transmission utilising the selected carrier, receive a transmission from the second apparatus, and select a carrier for second transmission to the second apparatus at least partly based on the transmission from the second apparatus.

According to an aspect of the present invention, there is provided a method in an apparatus in a communication system where the method includes steps of selecting a carrier for first transmission to a second apparatus, controlling transmission utilising the selected carrier, receiving a transmission from the second apparatus, and selecting a carrier for second transmission to the second apparatus at least partly based on the transmission from the second apparatus.

According to an aspect of the present invention, there is provided a computer program comprising instructions for causing an apparatus to at least perform selecting a carrier for first transmission to a second apparatus, controlling transmission utilising the selected carrier, receiving a transmission from the second apparatus, and selecting a carrier for second transmission to the second apparatus at least partly based on the transmission from the second apparatus.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

Figure 1:
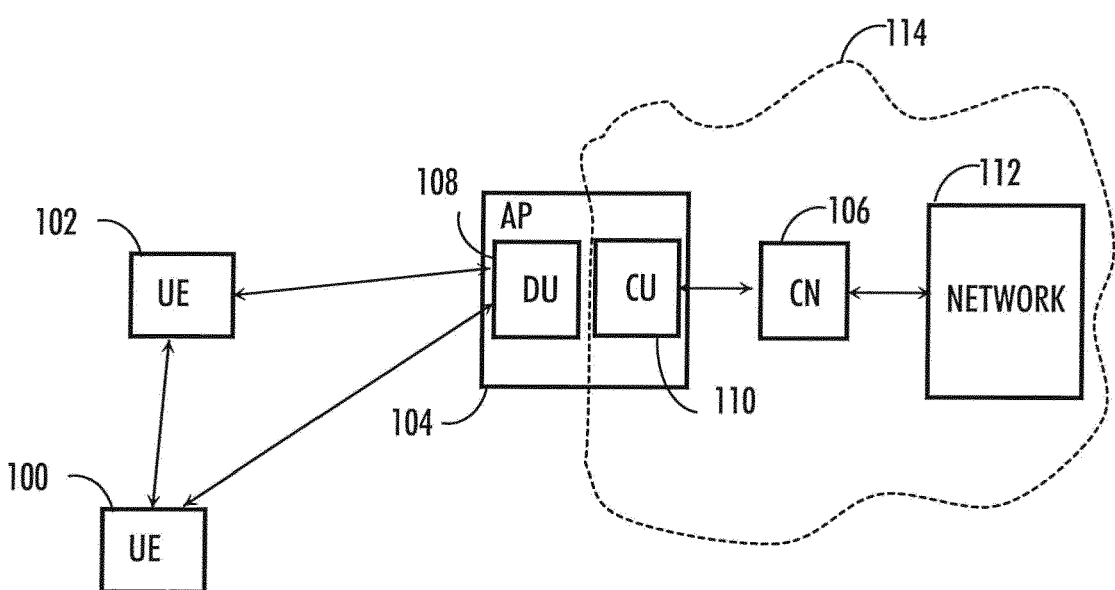

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node, such as (e/g)NodeB, serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
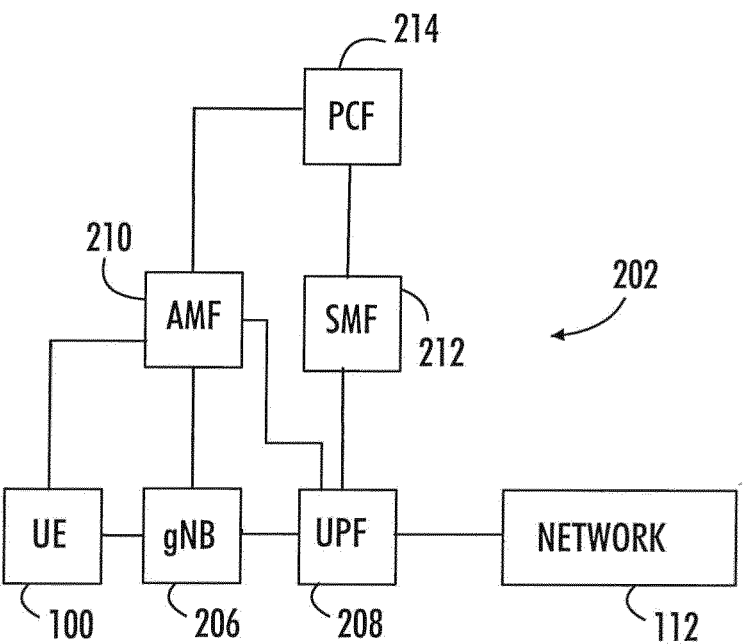

FIG. 2 illustrates an example of a communication system based on 5G network components. A user terminal or user equipment 100 communicating via a 5G network 202 with a data network 112. The user terminal 100 is connected to a Radio Access Network RAN node, such as (e/g)NodeB 206 which provides the user terminal a connection to the network 112 via one or more User Plane Functions 208. The user terminal 100 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function 214 which is configured to govern network behavior by providing policy rules to control plane functions.

As mentioned above, in 3GPP direct communication of user terminals or terminal devices not through a RAN node, is denoted as sidelink. In NR sidelink, there are two modes defined, Mode-1 and Mode 2. In Mode 1, user terminals request resources for sidelink communication from the network. In Mode 2, it is up to the communicating devices to select the resources for communication. According to a proposal, the terminal devices are configured to select a carrier to be used in communication on the basis of a Channel Busy Ratio, CBR, measurement. the CBR denotes congestion on a carrier. It is noted that the carrier mentioned in this document can also be interpreted as a resource pool to support sidelink communication. Thus, the carrier (re) selection solutions mentioned in this document may also be applicable for resource pool (re)selection.

In the prior art Mode 2 carrier (re-)selection procedure, a terminal device intending a side link, SL, transmission performs CBR measurements, and selects candidate carrier(s) based on the CBR measurement results, SL packet priority and any existing (pre-) configuration. A sidelink carrier is considered as a candidate carrier if its CBR is below a (pre)configured threshold associated with the priority of the sidelink transmission. When there is more than one candidate carrier available, the terminal device selects the candidate carrier with the lowest CBR value. A drawback of the current procedure is that it is focused on the CBR measured at the transmitting terminal device and does not consider the interference/congestion conditions at the receiving terminal device.

For example, assume a situation where two SL terminal devices transmit a SL packet to each other over the carrier for which they observe the lowest CBR. In this example, the minimum measured CBR at each SL terminal device may be on different carrier, implying that each SL terminal device may observe different interference/congestion conditions at their location. In this example, a first SL terminal device selects for transmission a carrier, which may be heavily congested at the second SL terminal device location. Respectively, the second SL terminal device may select carrier for transmission which in turn may be heavily congested at the first SL terminal device location.

Figure 3:
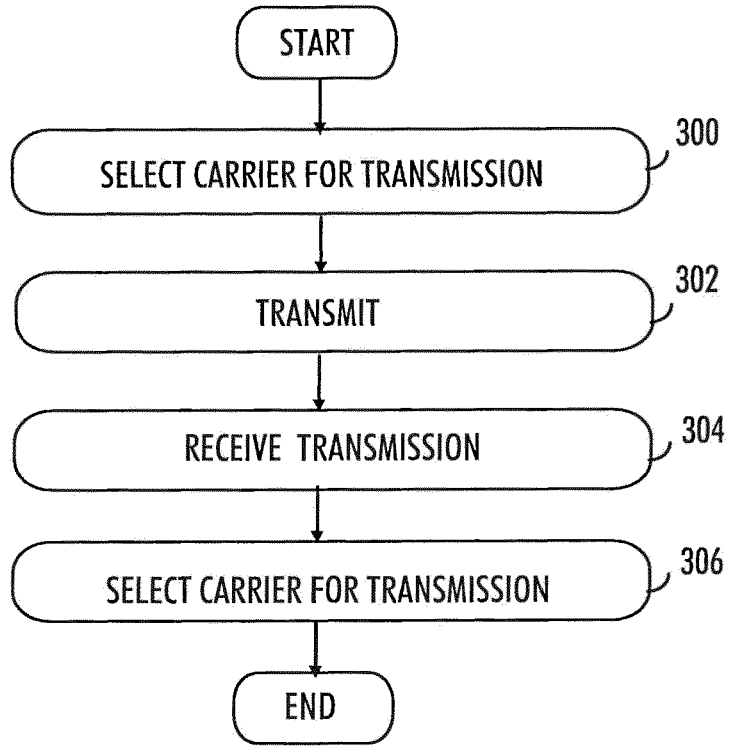
FIG. 3 is a flowchart illustrating some embodiments.

The flowchart of FIG. 3 illustrates an embodiment. The flowchart illustrates an example of the operation of an apparatus. In an embodiment, the apparatus may be a terminal device, a part of a terminal device or any other apparatus capable of executing following steps. In an embodiment, the apparatus is utilising sidelink communication.

In step 300, the apparatus is configured to select a carrier for first transmission to a second apparatus. In an embodiment, the carrier is selected based on a CBR measurement of different carriers, the measurement performed by the apparatus. In an embodiment, the candidate carrier with the lowest CBR value is selected for the first transmission.

In step 302, the apparatus is configured to control transmission utilising the selected carrier. In an embodiment, the apparatus may transmit a packet or a message to the second apparatus.

In step 304, the apparatus is configured to receive a transmission from the second apparatus.

In step 306, the apparatus is configured to select a carrier for second transmission to the second apparatus at least partly based on the transmission from the second apparatus.

There are various ways how the apparatus may take the transmission from the second apparatus into account when selecting a carrier for a second transmission to the second apparatus.

Figure 4:
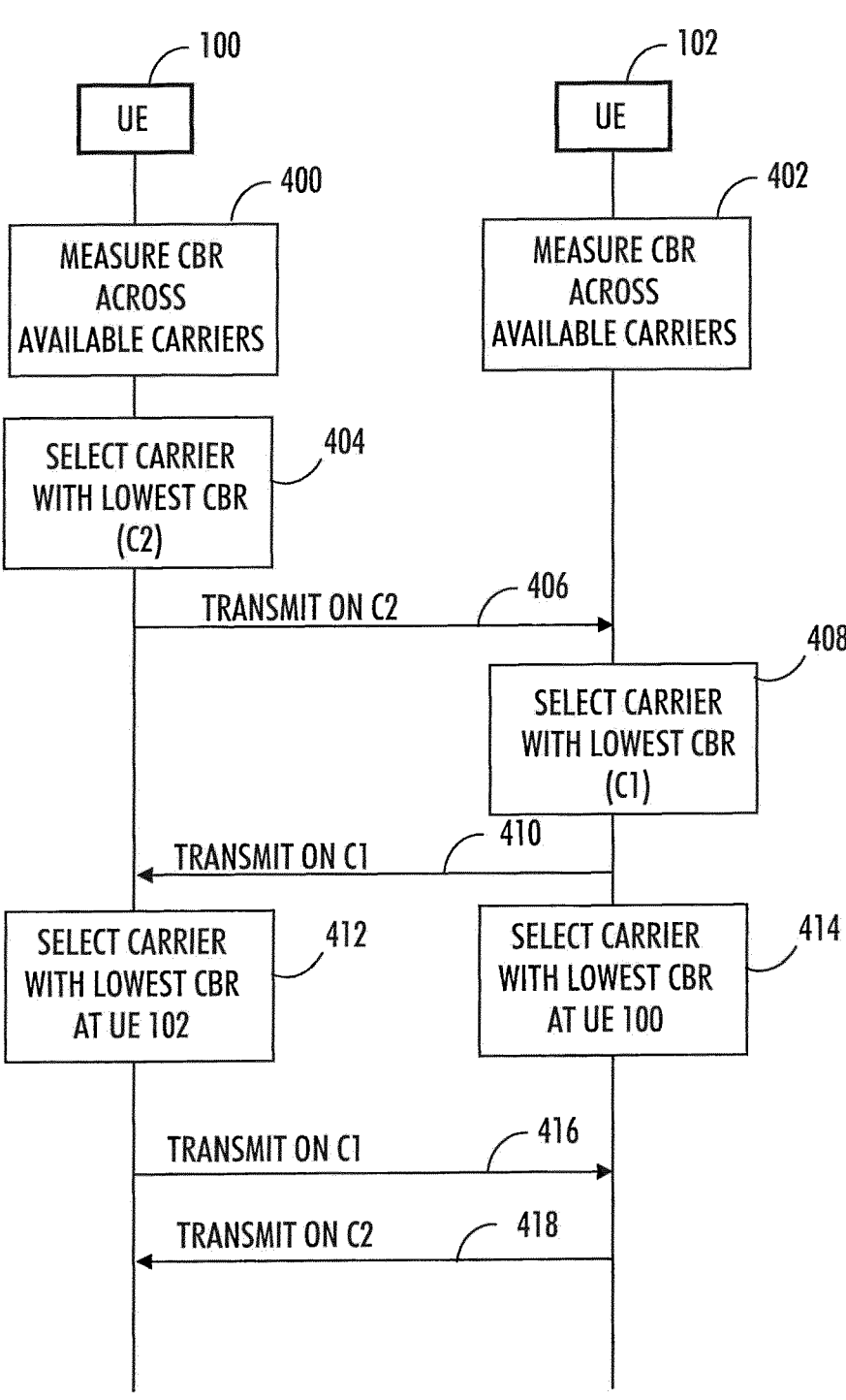
FIGS. 4, 5, 6 and 7 are signalling charts illustrating some embodiments of the invention.

FIG. 4 is a signalling chart illustrating an example. The chart illustrates the operation of the first apparatus 100 and the second apparatus 102.

The first and second apparatus are both configured to measure 400, 402 CBR across available/configured carriers.

The first apparatus is configured to select a carrier for transmission on the basis of the CBR measurement. In an embodiment, the candidate carrier with the lowest CBR is selected 404 for transmission. In this example, the selected carrier is denoted with C2.

Next, the first apparatus 100 transmits 406 to the second apparatus 102 utilising carrier C2.

The second apparatus 102 is configured to select a carrier for transmission on the basis of the CBR measurement. In an embodiment, the candidate carrier with the lowest CBR is selected 408 for transmission. In this example, the selected carrier is denoted with C1.

Next, the second apparatus 102 transmits 410 to the first apparatus 100 utilising carrier C1.

The first apparatus 100 is configured to select 412 a carrier for a second transmission on the basis of the transmission 410 of the second apparatus 102. In an embodiment, the first apparatus selects for transmission the carrier which the second apparatus measured having the lowest CBR, i.e. the carrier C1 the second apparatus used in the transmission 410.

In a similar manner, the second apparatus 102 is configured to select 414 a carrier for a second transmission based on the transmission 406 of the first apparatus 100. In an embodiment, the second apparatus selects for transmission the carrier which the first apparatus measured having the lowest CBR, i.e. the carrier C2 the first apparatus used in the transmission 406.

Next, the first apparatus 100 transmits 416 to the second apparatus 102 utilising carrier C1 and the second apparatus 102 transmits 418 to the first apparatus 100 utilising carrier C2.

Thus, after both terminal devices have exchanged at least one sequence of messages (i.e. transmissions 406, 410), both first and second terminal device are aware which carrier has the lowest CBR at their respective receiver. Then in further message exchange, both terminal devices are configured to this information to select the carrier with lowest CBR at their respective receiver, i.e the first terminal device transmits to the second terminal device using carrier C1 and the second terminal device transmits to the first terminal device using carrier C2.

Figure 5:
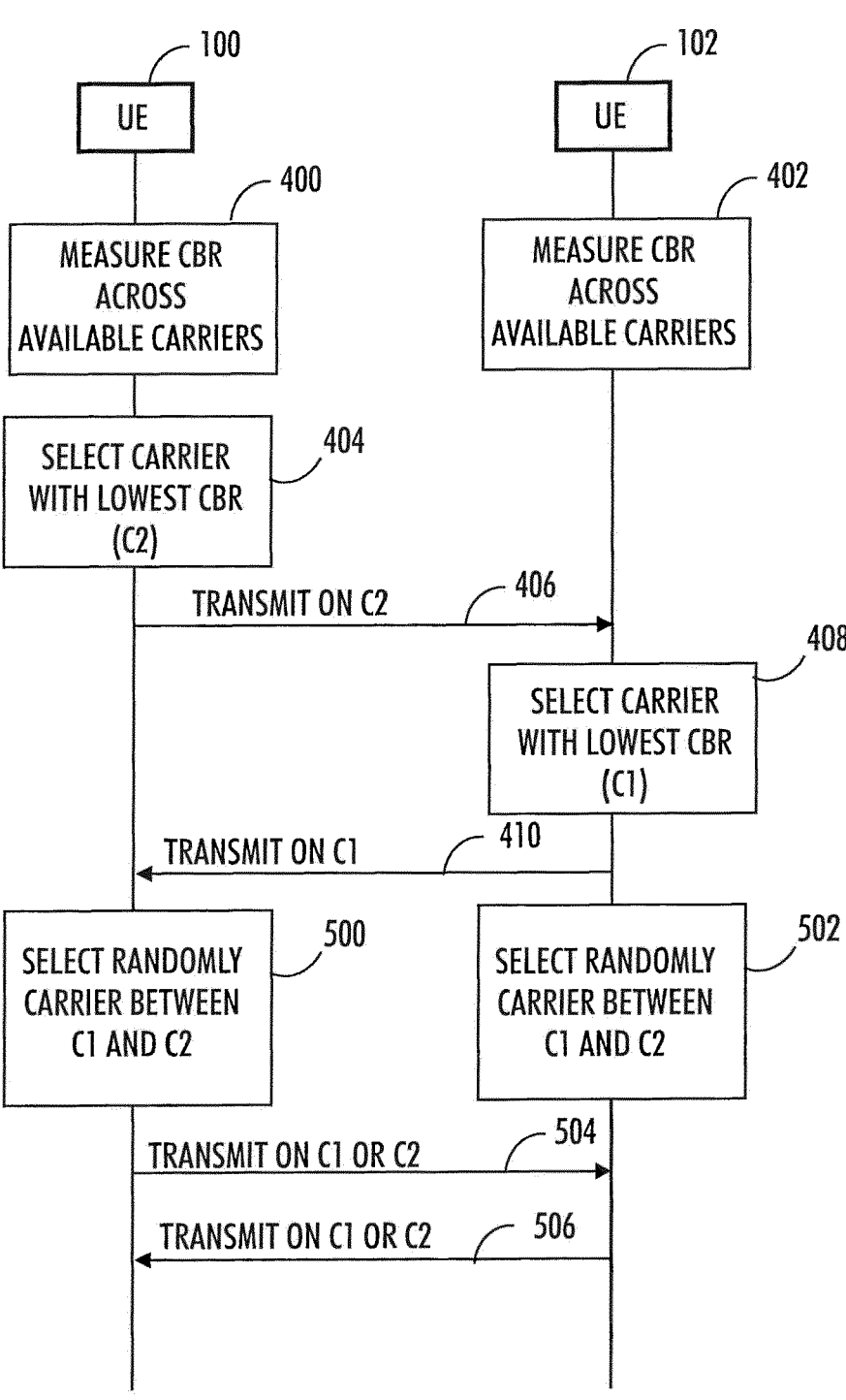

FIG. 5 is a signalling chart illustrating an example. The chart illustrates the operation of the first apparatus 100 and the second apparatus 102.

In this example, the transmitting first apparatus 100 selects for a second transmission randomly between the carrier selected by the second apparatus 102 and the best carrier indicated by own CBR measurements. Furthermore, in an embodiment, it is proposed that this carrier selection is only valid for a time period.

The first actions in the embodiment of FIG. 5 are similar to the actions of FIG. 4.

Thus, the first and second apparatus are both configured to measure 400, 402 CBR across available carriers.

The first apparatus is configured to select a carrier for transmission on the basis of the CBR measurement. In an embodiment, the carrier with the lowest CBR is selected 404 for transmission. In this example, the selected carrier is denoted with C2.

Next, the first apparatus 100 transmits 406 to the second apparatus 102 utilising carrier C2.

The second apparatus 102 is configured to select a carrier for transmission on the basis of the CBR measurement. In an embodiment, the carrier with the lowest CBR is selected 408 for transmission. In this example, the selected carrier is denoted with C1.

Next, the second apparatus 102 transmits 410 to the first apparatus 100 utilising carrier C1.

In an embodiment, the first apparatus is configured to set a carrier reselection timer/counter to zero.

Then if the first transmission carrier selected by first apparatus 100 is not the same as the first transmission carrier selected by the second apparatus 102 (i.e. C1≠C2) and the timer/counter has expired, then the first apparatus is configured to select 500 randomly between C1 and C2 and re-start time/counter with a (random) value.

In a similar manner, if the first transmission carrier selected by second apparatus 102 is not the same as the first transmission carrier selected by the first apparatus 100 (i.e. C2≠C1) and the timer/counter has expired, then the second apparatus is configured to select 502 randomly between C1 and C2 and re-start time/counter with a (random) value.

Next, the first apparatus 100 transmits 504 to the second apparatus 102 utilising either carrier C1 or C2, based on the random selection outcome at 500, for example, and the second apparatus 102 transmits 506 to the first apparatus 100 utilising either carrier C2 or C1, based on the random selection at 502, for example. After transmission, the timer/counter is updated. The timer/counter may be used to check if a random reselection should be triggered.

The embodiment of FIG. 5 has the advantage of switching between either the best carrier for the first apparatus 100 or the second apparatus 102. This may help mitigating any negative impact coming from a potential fact that the carrier selected by the second apparatus 102 is suboptimal for the first apparatus 100 in terms of interference and/or channel congestion, for example.

In a further embodiment, the random selection for transmitting over one of the two carriers could be based on a probability, which is impacted by the CBR difference between the two carriers (i.e. one selected by the transmitting apparatus, and the other by the receiving apparatus) measured at the transmitting apparatus.

For example, if the CBR difference measured at the transmitting apparatus is large between the two carriers selected by the transmitting apparatus and the receiving apparatus respectively, the transmitting apparatus may have a higher probability to select the carrier based on its own CBR measurement. As the transmitting apparatus is not aware of the detailed measurements of the different carriers at the receiving apparatus side. In an embodiment, the CBR difference measured at the receiving apparatus side may be very small, but the transmitting apparatus is not aware of this, as the receiving apparatus may not transmit this information to the transmitting apparatus explicitly. This approach proposed allows the transmitting apparatus to take its detailed CBR measurement into account, in order to balance the ratio of the packets transmitted in different carriers and avoid a high congestion on the carrier selected by the receiving apparatus.

Figure 6:
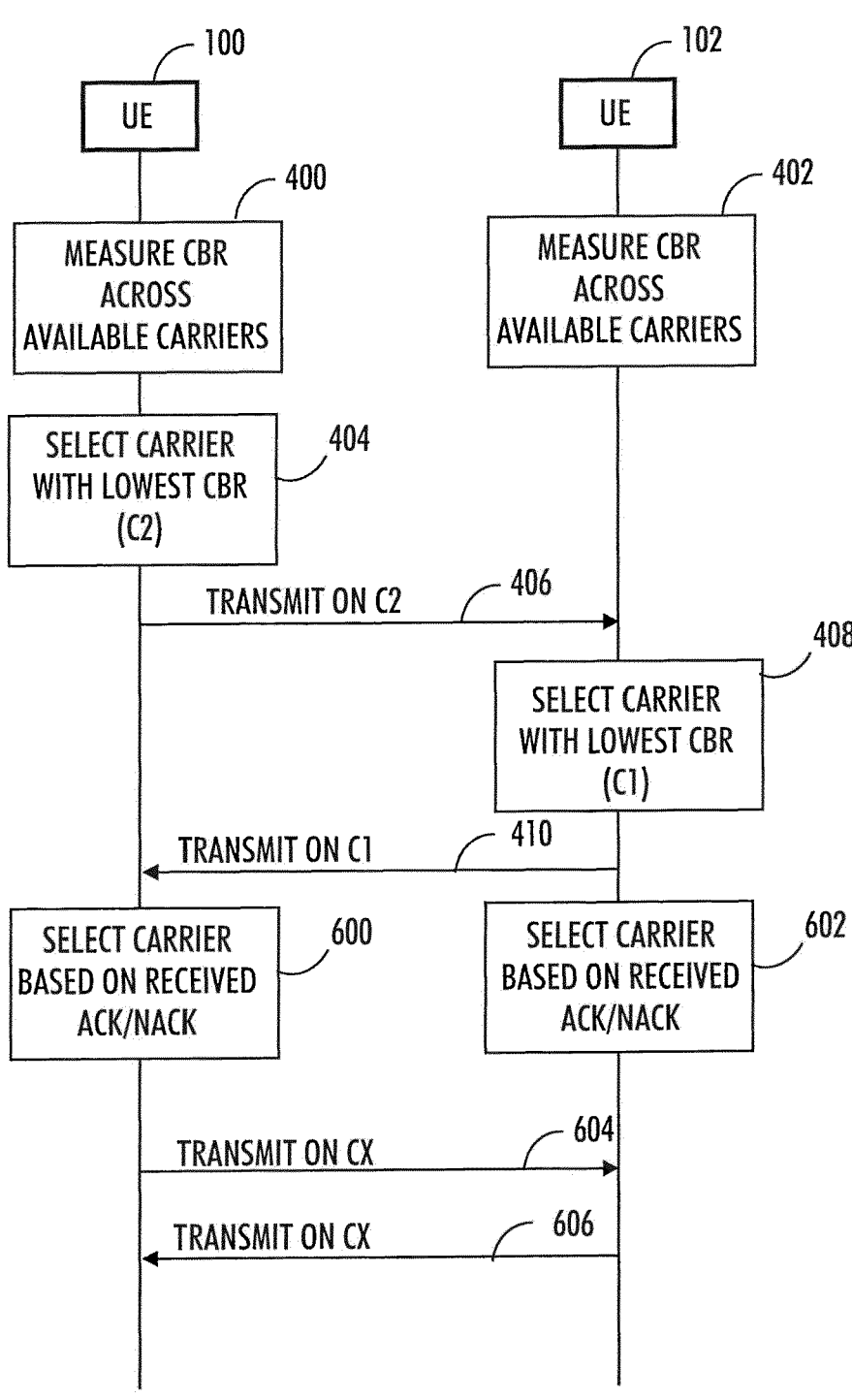

In an embodiment, the selection of the carrier for second transmission may be based on additional feedback from the receiving apparatus. For example, the feedback may be acknowledge/not acknowledge ACK/NACK messages transmitted by the receiving apparatus. In sidelink, the ACK/NACK feedback from the receiving apparatus can be used to indicate its packet reception status to the transmitting apparatus. In an embodiment, depending on the Physical Sidelink Feedback Channel, PSFCH, content received from the receiving apparatus at the transmitting apparatus over an observation period, the transmitting apparatus can then trigger the reselection of the transmitting carrier. FIG. 6 illustrates this embodiment.

FIG. 6 is a signalling chart illustrating an example. The chart illustrates the operation of the first apparatus 100 and the second apparatus 102.

The first actions in the embodiment of FIG. 6 are similar to the actions of FIG. 4 and FIG. 5.

Thus, the first and second apparatus are both configured to measure 400, 402 CBR across available carriers.

The first apparatus is configured to select a carrier for transmission on the basis of the CBR measurement. In an embodiment, the carrier with the lowest CBR is selected 404 for transmission. In this example, the selected carrier is denoted with C2.

Next, the first apparatus 100 transmits 406 to the second apparatus 102 utilising carrier C2.

The second apparatus 102 is configured to select a carrier for transmission on the basis of the CBR measurement. In an embodiment, the carrier with the lowest CBR is selected 408 for transmission. In this example, the selected carrier is denoted with C1.

The second apparatus 102 transmits 410 to the first apparatus 100 utilising carrier C1.

Next the first apparatus 100 is configured to select 600 the carrier for the second transmission based on acknowledge/not acknowledge ACK/NACK messages transmitted by the second apparatus 102. As mentioned before, an ACK/NACK message transmitted by the second apparatus 102 may indicate its reception status of a packet transmitted in 406 from the first apparatus 100 over a carrier selected, e.g. in 404 and/or 600. Likewise, the second apparatus 102 is configured to select 602 the carrier for the second transmission based on acknowledge/not acknowledge ACK/NACK messages transmitted by the first apparatus 100.

Next, the first apparatus 100 transmits 604 to the second apparatus 102 utilising selected carrier and the second apparatus 102 transmits 606 to the first apparatus 100 utilising selected carrier.

In an embodiment, in phase 600, the first apparatus resets the Hybrid automatic repeat request, HARQ, feedback counter with a pre-configured value. The value of counter may be (pre)configured by network, the terminal apparatus and/or implementation, for example. by considering the QoS requirements. In an embodiment, the apparatus may then update the HARQ feedback counter as follows:

When the first apparatus receives a NACK in the Physical Sidelink Feedback Channel, PSFCH, from the second apparatus, then it decreases the counter.

When the first apparatus receives an ACK in the PSFCH from the second apparatus, then it increases the counter.

While the communication is ongoing between the first and the second apparatus: if the counter reaches zero, then select between C2 (the best carrier of the first apparatus) and C1 (the best carrier of the second apparatus). In one example, the first apparatus may use its best carrier C2 until the counter reaches zero. Afterwards, the first apparatus may switch to the best carrier of the second apparatus.

The above is merely one example of possible ways of updating the counter.

It may be noted, that when the PSFCH is not transmitted by the second apparatus (due to the second apparatus not being able to decode the sidelink control information, SCI, associated with first apparatus transmission), the sidelink radio condition in this case may be worse than when the first apparatus receives a NACK in the PSFCH from the second apparatus, since the SCI is usually transmitted with a higher robustness than the data payload. Thus, the first apparatus may trigger the reselection of the carrier (either based on its CBR measurements or based on the carrier used by the second apparatus). Alternatively, the lack of PSFCH feedback may be considered as multiple of NACKs (e.g. two NACKs) when counter is applied as proposed above.

Allowing the solution to further rely on the PSFCH, or other feedback channels, allows an apparatus to more intelligently select between the carriers measured as best carriers for the first apparatus or the second apparatus, allowing the first apparatus to accommodate the best carrier of the second apparatus only in the case when the Quality of Service, QoS, requirements (e.g. reliability) cannot be fulfilled.

Figure 7:
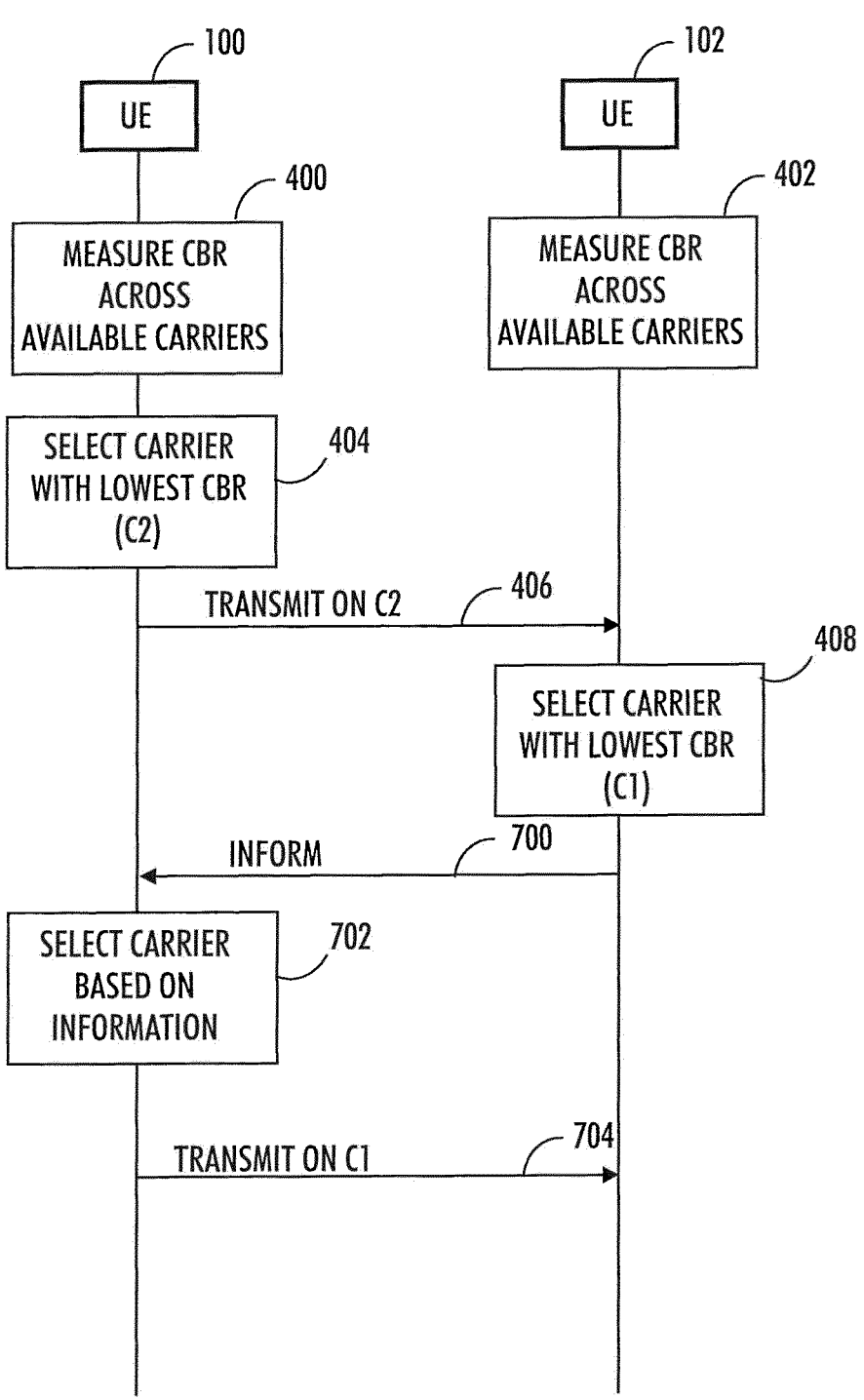

In an embodiment, the second apparatus may inform the transmitting first apparatus of the best carrier to use via explicit signalling. The triggering of this signalling may occur, for example, whenever the second apparatus deems that the carrier used by the transmitting first apparatus has a CBR above a (pre)configured threshold, or the number of HARQ NACK feedbacks has reached a threshold, or the conditions (e.g. interference, propagation) are not favourable. In an embodiment, the signalling can be specific Medium Access Control, MAC, Control Element, CE, payload, and/or an RRC message, where the second apparatus identifies which carrier (or set of carriers) should the transmitting first apparatus to use. FIG. 7 illustrates this embodiment.

The first actions in the embodiment of FIG. 7 are similar to the actions of FIG. 4.

Thus, the first and second apparatus are both configured to measure 400, 402 CBR across available carriers.

The first apparatus is configured to select a carrier for transmission on the basis of the CBR measurement. In an embodiment, the carrier with the lowest CBR is selected 404 for transmission. In this example, the selected carrier is denoted with C2.

Next, the first apparatus 100 transmits 406 to the second apparatus 102 utilising carrier C2.

The second apparatus 102 is configured to select a carrier for transmission on the basis of the CBR measurement. In an embodiment, the carrier with the lowest CBR is selected 408 for transmission. In this example, the selected carrier is denoted with C1.

The second apparatus 102 is configured to transmit 700 to the first apparatus 100 and inform the best carrier with the lowest CBR. The second apparatus may place the information in a MAC CE and/or an RRC message. The first apparatus receives a MAC CE and/or an RRC message, from the second apparatus indicating the peer's best carrier (or set of carriers).

The first apparatus is configured to select 702 the carrier for second transmission at least partially on the basis of the information received from the second apparatus and transmit 704 on the selected carrier. The carrier selection 702 may also take account of the CBR measurement at the first apparatus together with the information received from the second apparatus.

Figure 8:
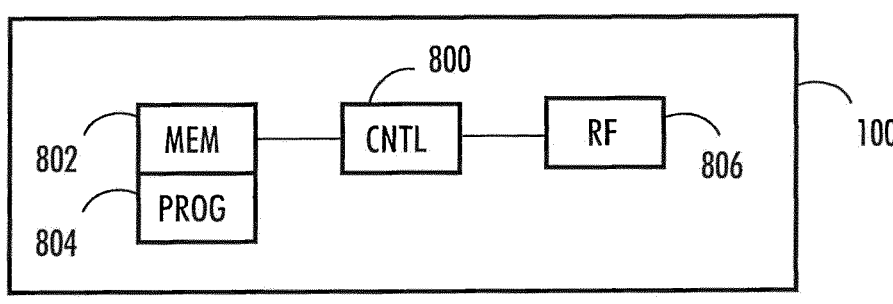
FIG. 8 illustrates an example of an apparatus.

FIG. 8 illustrates an embodiment. The figure illustrates a simplified example of an apparatus applying embodiments of the invention. In some embodiments, the apparatus may be a terminal device 100, 102, or a part of a terminal device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 100 of the example includes a control circuitry 800 configured to control at least part of the operation of the apparatus.

The apparatus may comprise a memory 802 for storing data. Furthermore, the memory may store software 804 executable by the control circuitry 800. The memory may be integrated in the control circuitry.

The apparatus may comprise one or more interface circuitries 806, The interface circuitries are operationally connected to the control circuitry 480. An interface circuitry 806 may be a set of transceivers configured to communicate with a RAN node such as an (e/g)NodeB of a wireless communication network and other terminal devices utilising side link. The interface circuitry may be connected to an antenna arrangement (not shown). The apparatus may also comprise a connection to a transmitter instead of a transceiver. The apparatus may further comprise a user interface.

In an embodiment, the software 804 may comprise a computer program comprising program code means adapted to cause the control circuitry 800 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus in a communication system comprising means configured to control transmission utilising the selected carrier; receive a transmission from the second apparatus; select a carrier for second transmission to the second apparatus at least partly based on the transmission from the second apparatus.

It will be obvious to a person skilled in the art that, as the technology advances, the inventive concept can be implemented in various ways. The invention and its embodiments are not limited to the examples described above but may vary within the scope of the claims.

What is claimed is:

1. A first apparatus in New Radio (NR) sidelink Mode 2 a communication system, comprising:

at least one processor; and at least one memory including instructions which, when executed by the at least one processor, cause the first apparatus to:

select a first sidelink carrier having a lowest measured Channel Busy Ratio (CBR) among available carriers for a first transmission to a second apparatus;

control the first transmission utilizing the first carrier;

receive, via a Physical Sidelink Feedback Channel (PSFCH), a transmission from the second apparatus comprising feedback information on a successful or an unsuccessful reception of the first transmission;

maintain a Hybrid Automatic Repeat Request (HARQ) feedback feedback counter by:

decrementing a value of the feedback counter in response to the received feedback information indicating an unsuccessful reception of the first transmission, and incrementing the value of the feedback counter in response to the received feedback information indicating a successful reception of the first transmission, wherein a lack of the received feedback information is treated as an unsuccessful reception; and in response to the value of the feedback counter reaching 0, select a second carrier for a second transmission to the second apparatus by randomly selecting between the first carrier and a third carrier utilized by the second apparatus for its transmission, wherein the random selection is based on a probability that is a function of a measured difference in a Channel Busy Ratio (CBR) between the first carrier and the third carrier apparatus.

2. The first apparatus of claim 1, wherein the second carrier is utilized for a predetermined time period.

3. The first apparatus of claim 2, wherein the instructions, when executed by the at least one processor, cause the first apparatus further to:

determine a CBR for a plurality of carriers; and select, as the first carrier, a carrier of the plurality of carriers having a lowest CBR.

4. A method in a first apparatus in a communication system, the method comprising the steps of:

selecting a first carrier for a first transmission to a second apparatus;

controlling the first transmission utilizing the first carrier;

receiving, via a Physical Sidelink Feedback Channel (PSFCH), a transmission from the second apparatus comprising feedback information on a successful or an unsuccessful reception of the first transmission;

maintaining a feedback counter by:

decrementing a value of the feedback counter in response to the received feedback information indicating an unsuccessful reception of the first transmission, and incrementing the value of the feedback counter in response to the received feedback information indicating a successful reception of the first transmission, wherein a lack of the received feedback information is treated as an unsuccessful reception; and in response to the value of the feedback counter reaching a predetermined threshold, selecting a second carrier for a second transmission to the second apparatus by randomly selecting between the first carrier and a third carrier utilized by the second apparatus in its transmission, wherein the random selection is based on a probability that is a function of a measured difference in a Channel Busy Ratio (CBR) between the first carrier and the third carrier.

5. The method of claim 4, wherein the second carrier is used for a predetermined time period.

6. The method of claim 4, further comprising:

determining a CBR for a plurality of carriers; and selecting, as the first carrier, a carrier of the plurality of carriers having a lowest CBR.

7. A non-transitory computer readable medium storing program instructions which, when executed by a first apparatus, cause the first apparatus to at least perform:

selecting a first carrier for a first transmission to a second apparatus;

controlling the first transmission utilizing the carrier;

receiving, via a Physical Sidelink Feedback Channel (PSFCH), a transmission from the second apparatus comprising feedback information on a successful or an unsuccessful reception of the first transmission;

maintaining a feedback counter by:

decrementing a value of the feedback counter in response to the received feedback information indicating an unsuccessful reception of the first transmission, and incrementing the value of the feedback counter in response to the received feedback information indicating a successful reception of the first transmission, wherein a lack of the received feedback information is treated as an unsuccessful reception; and in response to the value of the feedback counter reaching a predetermined threshold, selecting a second carrier for a second transmission to the second apparatus by randomly selecting between the first carrier and a third carrier utilized by the second apparatus in its transmission, wherein the random selection is based on a probability that is a function of a measured difference in a Channel Busy Ratio (CBR) between the first carrier and the third carrier.

* * * * *